(12) United States Patent
Cheng et al.

(10) Patent No.: US 8,482,528 B2
(45) Date of Patent: Jul. 9, 2013

(54) ULTRA MOBILE PERSONAL COMPUTER

(75) Inventors: Ping-Yu Cheng, Taipei (TW); Chien-Chu Lu, Taipei (TW)

(73) Assignee: Flextronics Computing Mauritius Ltd., Ebene (MU)

( * ) Notice: Subject to any disclaimer, the term of this patent is extended or adjusted under 35 U.S.C. 154(b) by 1476 days.

(21) Appl. No.: 11/754,351

(22) Filed: May 28, 2007

(65) Prior Publication Data

US 2008/0198136 A1   Aug. 21, 2008

(30) Foreign Application Priority Data

Feb. 16, 2007   (TW) ............................... 96203250 U

(51) Int. Cl.
*G06F 3/02*   (2006.01)
(52) U.S. Cl.
USPC ........................................................ 345/169

(58) Field of Classification Search
USPC ........... 345/168, 169, 173; 361/727; 439/377; 312/223.2; 248/920; 455/556.1, 556.2; 341/22
See application file for complete search history.

(56) References Cited

U.S. PATENT DOCUMENTS

| | | | | |
|---|---|---|---|---|
| 6,229,697 B1* | 5/2001 | Selker | ...................... | 361/679.09 |
| 6,640,114 B2* | 10/2003 | Bae | ............................... | 455/566 |
| 6,842,338 B2* | 1/2005 | Iredale | ..................... | 361/679.06 |
| 7,412,258 B1* | 8/2008 | Lipponen et al. | ........... | 455/556.1 |
| 7,659,885 B2* | 2/2010 | Kraus et al. | ................... | 345/168 |

* cited by examiner

*Primary Examiner* — Abbas Abdulselam
(74) *Attorney, Agent, or Firm* — Haverstock & Owens LLP

(57) ABSTRACT

An ultra mobile personal computer includes a monitor, a keyboard apparatus, and a micro-touchpad. The monitor is coupled on the keyboard apparatus such that the monitor could be shifted relatively to the keyboard apparatus to display a keyboard panel built inside. In addition, the micro-touchpad is arranged on the keyboard apparatus.

19 Claims, 3 Drawing Sheets

ULTRA MOBILE PERSONAL COMPUTER

RELATED APPLICATIONS

This application claims priority to Taiwan Application Serial Number 96203250, filed Feb. 16, 2007, which is herein incorporated by reference.

BACKGROUND

1. Field of Invention

The present invention relates to an electronic device. More particularly, the present invention relates to an ultra mobile personal computer.

2. Description of Related Art

An ultra mobile personal computer (UMPC) is a type of personal computer wherein the monitor of the UMPC is larger than personal digital assistant devices, and the volume of the UMPC is smaller than laptops. Additionally, operating systems or software can be installed in the UMPC. The appearance of the UMPC is similar to handheld game consoles, not only having small volume, but also with a portable hard disk, bluetooth, or card reader built into the UMPC. It is a very ideal mobile device.

Although the UMPC is portable and handy, the conventional design of the UMPC has control sticks, navi keys or direction buttons that causes inconvenience of controlling the cursor for users. The users have to exert their fingers continuously to control sticks or direction buttons to move the cursor to a target. Additionally, the positions of the direction buttons or control sticks arranged on the conventional UMPC are not considered, so users cannot move their fingers comfortably and quickly while holding the UMPC. This results in more difficulties to control the cursor.

For the forgoing reasons, there is a need for improving the design of the cursor control of the UMPC.

SUMMARY

The present invention is directed to an ultra mobile personal computer which includes a micro-touchpad, that satisfies the operation need for users.

It is therefore an objective of the present invention to provide an ultra mobile personal computer, comprising a keyboard apparatus and a monitor. The monitor is coupled on the keyboard apparatus such that the monitor could be shifted relatively to the keyboard apparatus. Moreover, the monitor comprises a micro-touchpad and at least two control keys. The micro-touchpad and the two control keys are all arranged on a surface of the monitor that is back on to the keyboard apparatus, and are respectively close to two terminals of a long edge of the surface.

It is another objective of the present invention to provide an ultra mobile personal computer, which comprises a keyboard apparatus and a monitor. The monitor is coupled on the keyboard apparatus such that the monitor could be shifted relatively to the keyboard. Moreover, the monitor comprises a micro-touchpad and at least two control keys. The micro-touchpad and the two control keys are all arranged on a surface of the monitor that is back on the keyboard apparatus, and are positioned on two terminals of a lateral edge of the surface that is close to the keyboard apparatus.

It is still another objective of the present invention to provide an ultra mobile personal computer, which comprises a keyboard apparatus and a monitor. The monitor is coupled on the keyboard apparatus such that the monitor could be shifted relatively to a first axis of the keyboard. Moreover, the monitor comprises a micro-touchpad and at least two control keys. The micro-touchpad and the two control keys are all arranged on a surface of the monitor that is back on to the keyboard apparatus, and are positioned on two lo sides of the first axis respectively.

As embodied and broadly described herein, the invention provides an ultra mobile personal computer with a micro-touchpad thereon. Compared with the conventional control sticks or direction buttons, by touching the micro-touchpad with the thumb and sliding the thumb, the user could move the cursor quickly while holding the ultra mobile personal computer. In addition, since the micro-touchpad and the two control keys are positioned on two sides of the monitor respectively, this design helps the user operate the ultra mobile personal computer while holding it. The user can touch the micro-touchpad with one thumb of one hand and manipulate the control keys with the other hand at the same time which simulates the movement of mouse and the function of the left and right keys of the mouse. Therefore, the convenience of operation can be improved.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
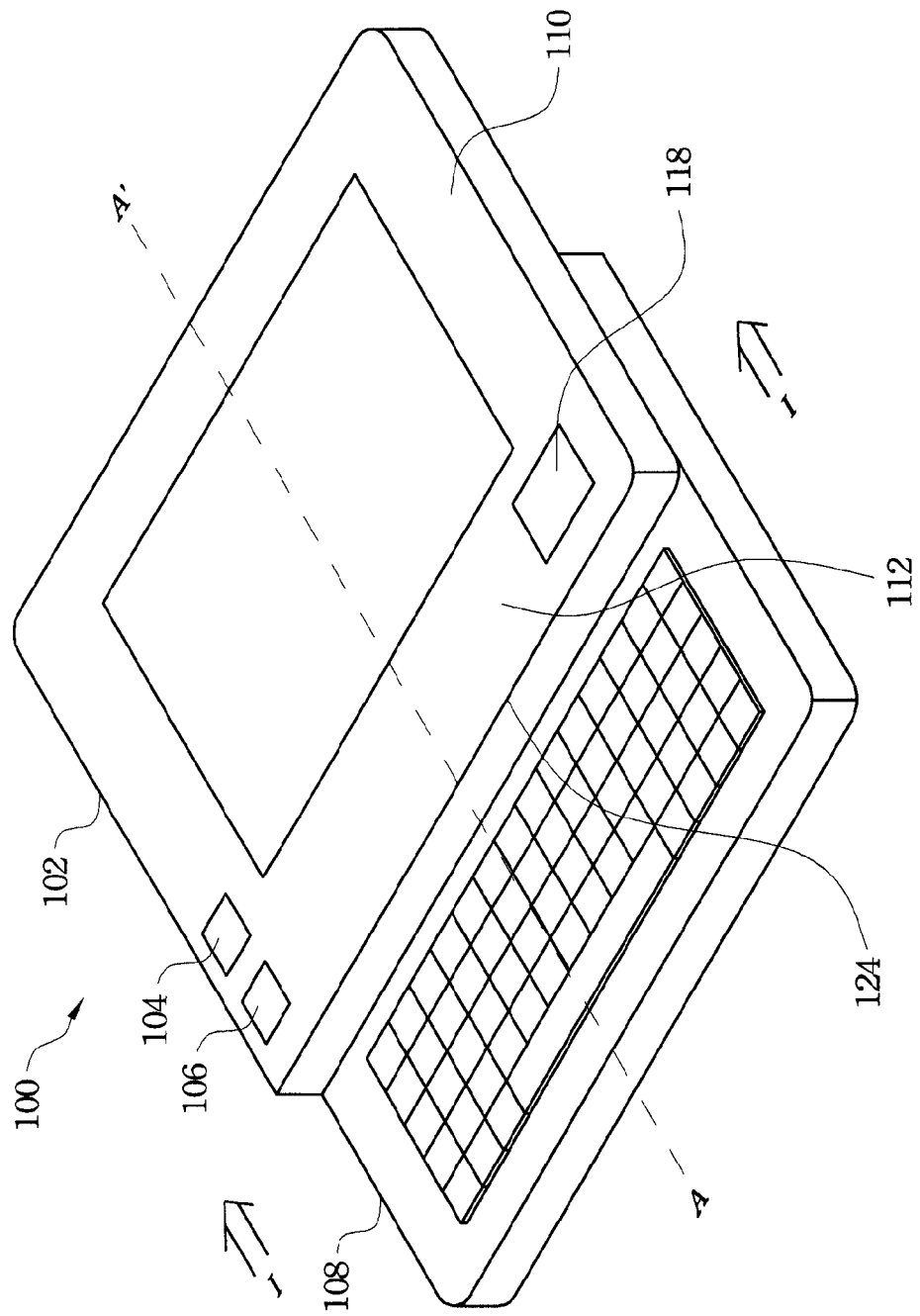
FIG. 1 is a prospective view of an ultra mobile personal computer of one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, it illustrates a prospective view of an ultra mobile personal computer of one embodiment of the present invention. In FIG. 1, the ultra mobile personal computer 100 comprises a monitor 102 and a keyboard apparatus 108. The monitor 102 is coupled on the keyboard apparatus 108 such that the monitor 102 could be shifted relatively to the keyboard apparatus 108 along with a first axis AA' and the keyboard panel built inside could be displayed. Therefore, if the user would like to key in something, the keyboard apparatus 108 can be displayed by pushing the monitor 102 along the direction I.

Moreover, a micro-touchpad 118 and two control keys 106 and 104 are all arranged on surface 110 of the monitor 102 that is back on to the keyboard apparatus 108. According to one embodiment of the present invention, the micro-touchpad 118 and the control keys 106 and 104 are positioned on two sides of the first axis AA' respectively. According to another embodiment of lo the present invention, the micro-touchpad 118 and the control keys 106 and 104 are arranged respectively close to two terminals of a long edge 124 of the surface 110. Therefore, the user can operate the ultra mobile personal computer 100 more conveniently. According to another embodiment of the present invention, the micro-touchpad 118 and the control keys 106 and 104 are positioned on two terminals of a lateral edge 112 of the surface 110 that is close to the keyboard apparatus 108. Hence, it is quite handy for users to use the micro-touchpad 118, the control keys 106, 104, and the keyboard apparatus 108 at the same time.

The micro-touchpad 118 mentioned above is used to control the movement of the cursor, and the control keys 106 and 104 are for confirming orders and choosing functions similar to the left and right keys of the mouse respectively.

Figure 2:
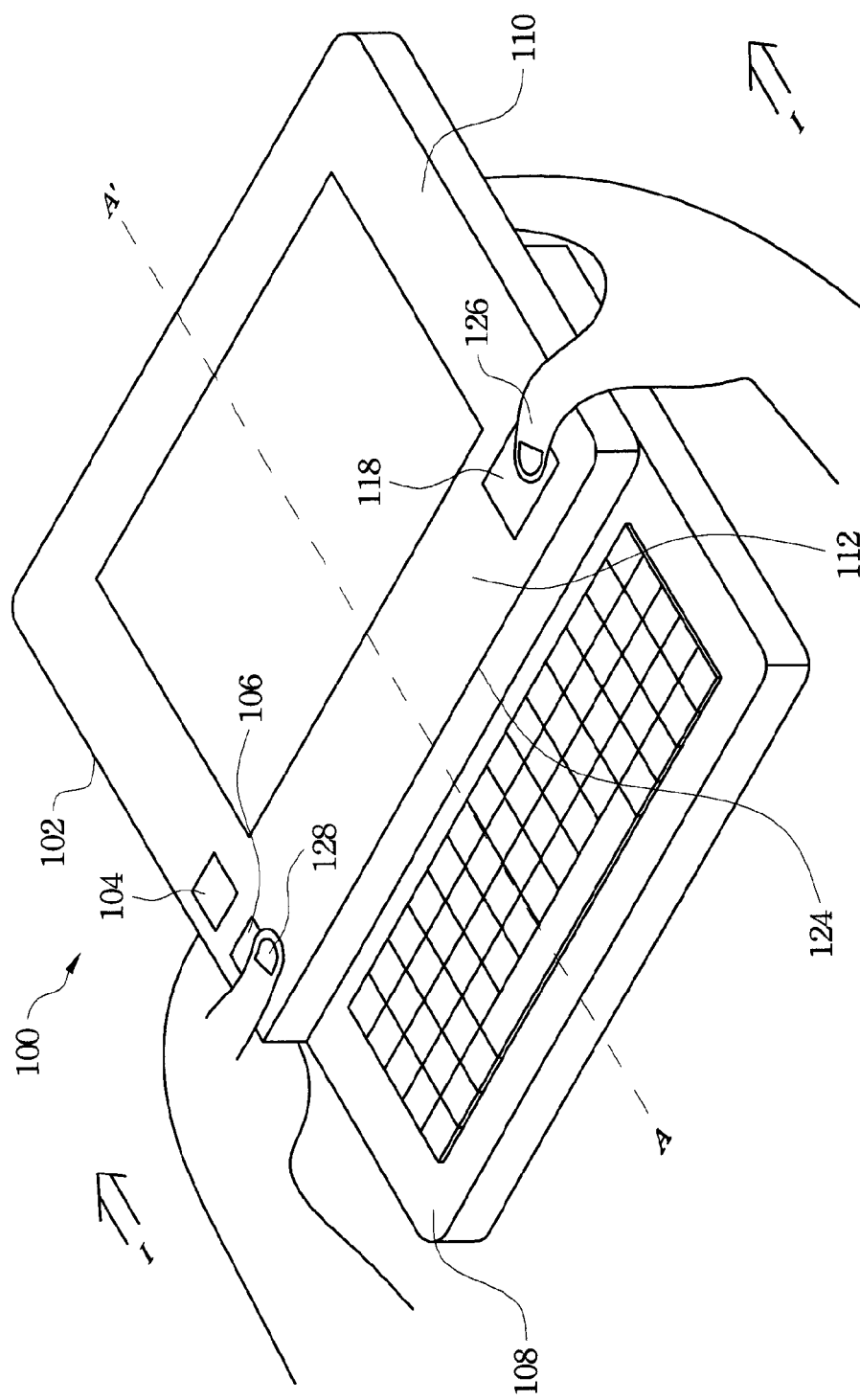
FIG. 2 is a prospective view of using an ultra mobile personal computer of one embodiment of the present invention according to one preferred embodiment of this invention.

Next, FIG. 2, illustrates a prospective view of using an ultra mobile personal computer of one embodiment of the present invention. Because of the relative positions between the micro-touchpad 118 and the control keys 106 and 104, the space between them is large and is not too cramped. Therefore, the user can operate the micro-touchpad 118 and the control keys 106 and 104 with both thumbs while holding the ultra mobile personal computer. For example, the user can control the movement of the cursor by positioning the thumb 126 of right hand on the micro-touchpad 118, and confirm order or choose functions by the thumb 128 of the left hand on the control keys 106 or 104.

Figure 3:
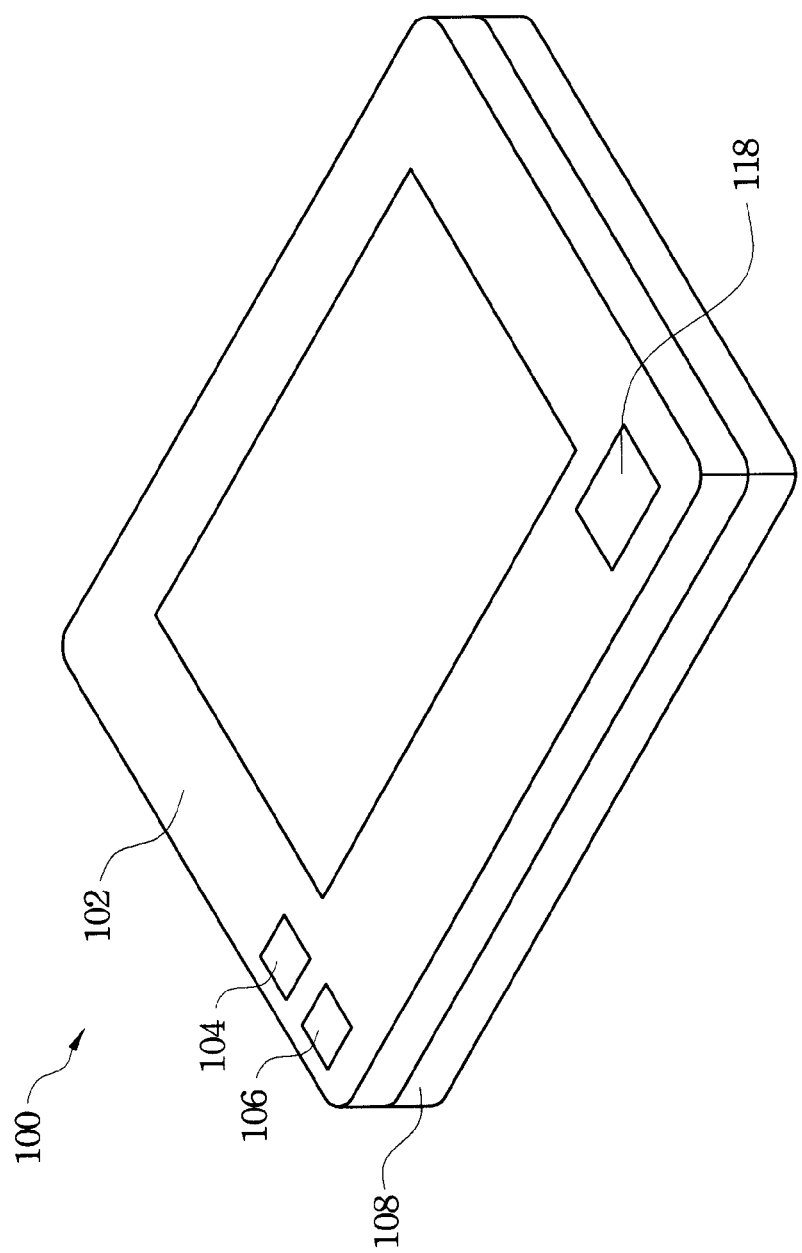
FIG. 3 is a prospective view of an ultra mobile personal computer of one embodiment of the present invention.

In FIG. 3., a prospective view of an ultra mobile personal computer of one embodiment of the present invention is illustrated. According to FIG. 3, the lo user can overlap the monitor 102 and the keyboard apparatus 108 to reduce the volume of the ultra mobile personal computer when the keyboard apparatus 108 is not used. Moreover, since the micro-touchpad 118 and the control keys 106 and 104 are arranged on two sides of the monitor, it does not affect the convenience of controlling the cursor or holding posture of user when the keyboard apparatus 108 is closed.

Accordingly, the ultra mobile personal computer 100 mentioned above comprises the micro-touchpad 118 arranged on the monitor 102, so the user can control the cursor by touching the micro-touchpad 118. Compared with the conventional direction button or control stick, the user does not have to exert fingers to control the cursor. Thus, the operation is easier. Moreover, the function of the control keys 106 and 104 are equal to the left and right keys of the mouse and their positions are relative to the micro-touchpad 118, which are positioned on two sides of the monitor 102 respectively, so the user can control the movement of the cursor and confirm order or choose functions by positioning one hand on the micro-touchpad 118, and putting the other hand on the control keys 104 and 106. Additionally, no matter if the keyboard apparatus 108 is opened or closed, the user can manipulate the ultra mobile personal computer 100 by holding it and moving the fingers comfortably.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An ultra mobile computer comprising:
   a keyboard having a top surface;
   a monitor with a top surface and a bottom surface, the bottom surface slidably coupled to the top surface of the keyboard such that the keyboard and monitor shift relative to each other parallel to an axis, the axis being parallel to the top surface and the bottom surface of the monitor and dividing the monitor into a first side and a second side;
   a micro-touchpad arranged on the first side of the top surface of the monitor; and
   at least two control keys arranged on the second side of the top surface of the monitor.

2. The ultra mobile computer of claim 1, wherein a first of the two control keys confirms an order given to or presented by the ultra mobile computer.

3. The ultra mobile computer of claim 2, wherein a second of the two control keys chooses a function of the ultra mobile computer.

4. The ultra mobile computer of claim 1, wherein the axis is perpendicular to and bisects a first edge of the monitor and a second edge of the monitor.

5. The ultra mobile computer of claim 4, wherein the monitor only partially overlaps the keyboard in a first monitor-keyboard configuration.

6. The ultra mobile computer of claim 5, wherein the monitor fully overlaps the keyboard in a second monitor-keyboard configuration.

7. The ultra mobile computer of claim 6, wherein the micro-touchpad and the two control keys are arranged adjacent to the first edge of the monitor, the first edge of the monitor being adjacent to a majority of the keyboard in the first monitor-keyboard configuration.

8. The ultra mobile computer of claim 1, wherein:
   the first side is the right side of the monitor; and
   the second side is the left side of the monitor.

9. An apparatus comprising:
   an ultra mobile computer monitor;
   a keyboard slidably coupled to the ultra mobile computer monitor, and configured to slide out from under the ultra mobile computer monitor;
   a micro-touchpad arranged on a first side of the ultra mobile computer monitor;
   at least two control keys arranged on a second side of the ultra mobile computer monitor; and
   an axis arranged parallel to a top surface of the ultra mobile computer monitor and bisecting a first edge of the ultra mobile computer monitor and a second edge of the ultra mobile computer monitor, wherein the axis divides the ultra mobile computer monitor into a first side and a second side.

10. The apparatus of claim 9, wherein a first of the two control keys confirms an order given to or presented by the apparatus.

11. The apparatus of claim 9, wherein a second of the two control keys chooses a function of the apparatus.

12. The apparatus of claim 9, wherein the keyboard shifts parallel to the axis in a first direction, the first direction being oriented from the second edge of the ultra mobile computer monitor towards the first edge of the ultra mobile computer monitor.

13. The apparatus of claim 12, wherein the micro-touchpad and the two control keys are arranged adjacent to the first edge of the ultra mobile computer monitor.

14. The apparatus of claim 9, wherein:
   the first side is the right side of the ultra mobile computer monitor; and
   the second side is the left side of the ultra mobile computer monitor.

15. The ultra mobile computer of claim 9, wherein the ultra mobile computer monitor partially overlaps the keyboard in a first monitor-keyboard configuration.

16. The ultra mobile computer of claim 15, wherein the ultra mobile computer monitor fully overlaps the keyboard in a second monitor-keyboard configuration.

17. A method comprising:
controlling movement of a cursor, in at least two non-parallel directions, of an ultra mobile computer monitor via a micro-touchpad;
confirming an order of the ultra mobile computer via a first control key;
choosing a function of the ultra mobile computer via a second control key;
entering text into the ultra mobile computer via a keyboard that is slidably coupled to the ultra mobile computer monitor and shifts relative to the ultra mobile computer monitor parallel to an axis that is parallel to a top surface of the ultra mobile computer monitor; and
sliding the keyboard under the ultra mobile computer monitor in a first direction, the first direction being parallel to the axis,
wherein the micro-touchpad is arranged proximal to an edge of the ultra mobile computer monitor, and
wherein the edge is adjacent to the keyboard when the keyboard is slid out from under the ultra mobile computer monitor.

18. The method of claim 17 further comprising accessing the first control key and the second control key with a first thumb of a first hand while maintaining a supporting grip on the ultra mobile computer with the first hand.

19. The method of claim 18 further comprising accessing the micro-touchpad with a second thumb of the second hand while maintaining a supporting grip on the ultra mobile computer with the second hand.

\* \* \* \* \*